July 19, 1932.  J. H. HUNT  1,868,234
PLANETARY FRICTION TRANSMISSION
Filed Oct. 19, 1931   2 Sheets-Sheet 1

July 19, 1932.    J. H. HUNT    1,868,234
PLANETARY FRICTION TRANSMISSION
Filed Oct. 19, 1931    2 Sheets-Sheet 2

Inventor
John H. Hunt
By Blackman, Spencer & Hunt
Attorneys

Patented July 19, 1932

1,868,234

UNITED STATES PATENT OFFICE

JOHN H. HUNT, OF DETROIT, MICHIGAN, ASSIGNOR TO GENERAL MOTORS CORPORATION, OF DETROIT, MICHIGAN, A CORPORATION OF DELAWARE

PLANETARY FRICTION TRANSMISSION

Application filed October 19, 1931. Serial No. 569,731.

This invention relates to transmissions employing planetary motion of torque transmitting rollers where such rollers revolve on their own axes and the latter revolve around the main axis of the transmission and where the axes of the rollers may lie at an angle to the main transmission axis or otherwise than parallel thereto.

Such transmissions will usually be of the variable speed planetary type in which friction rollers are interposed between coaxial discs provided with annular toric grooves in their opposed faces, the rollers being mounted in roller carriers which are themselves mounted in a roller cage.

In its simplest form, one of the coaxial toric discs or races may be the driving member and the other disc a stationary member whilst the driven member is the roller cage carrying the planetary rollers. In another form such as that shown in British Patent 343,988 there may be two sets of rollers in parallel forming a double toric transmission in which the end races may be connected to rotate with the input shaft whilst a central race common to the two sets of planetary rollers may be held stationary, the driven shaft being connected to the roller cages.

In any variable speed friction transmission of the toroidal type and whether planetary or otherwise, change of ratio is effected by tilting each roller axis in a plane passing through the center of the roller and containing the main transmission axis. The roller is tilted to a circle of contact of larger radius on one disc and of smaller radius on the other. This change of tilt and corresponding change of ratio may, through suitable controls for the rollers, be carried out directly or not. It may be the resultant motion from inclination (i. e. turning of the roller about an axis passing through the points of contact of the roller with the races) or from bodily displacement of the roller, all as hereinafter described. It is immaterial for the purposes of the present invention just how the change of tilt is effected.

In such a transmission, of the planetary type, the rollers have each a combination of angular velocities about two axes at an angle with each other whenever the axes of the rollers lie otherwise than parallel to the main transmission axis in planes containing the two axes of rotation.

Now when a mass rotates with a combination of angular velocities about two axes at an angle with each other, a gyroscopic torque is developed. In the case of the rollers in the transmission, this gyroscopic torque tends to turn or tilt the rollers in the plane (i. e. about an axis normal to such plane) passing through the center of the roller and containing the main transmission axis. This torque tends to tilt the roller, with slippage at the points of contact, and to change the ratio.

It can be shown that the gyroscopic torque has such a direction as to shift or to tend to shift the roller toward a higher ratio of output to input shaft speeds.

This torque or tilting couple may, in actual practice at input shaft speeds of 3000 R. P. M. have a magnitude of more than twice that of the torque received and delivered as power by the roller itself.

These gyroscopic forces must be resisted, either by the friction at the roller contact points involving, in the immediately foregoing instance, a pressure between rollers and races more than twice that required to transmit the power, or they must be resisted in some way through the control means, if they are not otherwise balanced.

Increased axial loading to prevent the creep or tilt of a roller under the influence of the gyroscopic torque is undesirable as involving higher contact stresses and lower durability.

Furthermore, if for any reason there is a variation in contact capacity or loading among the rollers, it is possible under the influence of the gyroscopic forces for the rollers to get out of ratio relatively to one another with consequent destructive binding or slipping and loss of efficiency.

It should be noted that even if there were no gyroscopic or centrifugal forces tending to change the ratio of a variable speed friction transmission, it would still be possible for the rollers to tilt out of ratio relatively to one another as a result of variations in say contact capacity or loading unless the rollers, their mountings and control parts are made with sufficient accuracy and strength that all the rollers deliver a sufficiently equal amount of power at the same ratio and unless the roller support is rigid enough to have no yield effecting tilt by inclination, bodily displacement, or in any other way.

It is not, however, always convenient or commercially expedient to build a friction transmission in which no yield of the roller support with bodily displacement or inclination and consequent tilt with resultant change of ratio of any roller relatively to the others is possible.

For these and other reasons there is considerable advantage in designing the mechanism in such a way that an overloaded roller automatically changes its tilt very slightly and in a direction corresponding to a ratio position in which it carries a smaller load. The load through the rollers of such a transmission is thus "equalized."

Whether the transmission is "equalized" or "non-equalized" it is very desirable that where planetary operation is involved, some means, other than a resistance through increased axial loading or through the control means should be employed to prevent change of tilt and ratio under the influence of the gyroscopic torque and other forces peculiar to planetary operation.

The neutralization of the gyroscopic torque is very desirable in the equalized type in order that equalization shall not be interfered with and since the strength and especially the construction of the parts in equalized transmission is not otherwise capable of absorbing or resisting the gyroscopic torque.

In addition to the gyroscopic torque there is a centrifugal torque due to the unequal radial disposition of the roller about the transmission shaft axis for all angular positions of the roller other than those in which the roller axis is either normal to the transmission shaft axis or parallel thereto. This centrifugal torque is reversed as the roller axis is tilted from one side to the other of the normal to the transmission shaft axis but is in the same direction as the gyroscopic torque for roller positions giving drive ratios of output to input greater than one to two.

The object of the invention is to provide means for counterbalancing or neutralizing these gyroscopic and centrifugal torques of which the gyroscopic torque is the principal one and to do this by incorporating a second wheel of suitable mass and moment of inertia rotating around each roller axis in the reverse direction to the roller.

The wheel may or may not have the same angular velocity as the roller. There is some advantage in rotating a wheel with a smaller moment of inertia at a higher speed.

So far as the gyroscopic forces are concerned the wheel may be mounted either on the outer end of the roller axis or on the inner end although from space considerations mounting at the outer end is likely to be the more advantageous.

In addition however if the centrifugal moment about the roller carrier tilting axis of those portions of the combined masses of roller carrier and balance wheel grouped on the outside of the roller is greater than the centrifugal moment of those portions grouped on the inside of the roller, there will be a resultant centrifugal torque opposing the centrifugal torque on the roller for all roller positions giving drive ratios of output to input other than one to two.

There is thus a further advantage in mounting the balance wheel on the outer end of the roller axis since otherwise its additional mass would have to be counterbalanced by a mass of still larger centrifugal moment on the outside of the roller if the centrifugal torque on the roller is not to be actually augmented.

The accompanying drawings show the application of the invention to a single toric planetary variable speed friction transmission in which change of ratio is effected by tilt induced by bodily displacement of the rollers accompanied by restoration and in which equalization between the rollers is automatically effected. This embodiment has been chosen for purposes of example only and it will be understood that the invention is applicable to any transmission employing planetary motion of torque transmitting rollers where such rollers revolve on their own axes and the latter revolve around the main axis of the transmission and where the axes of the rollers may lie at an angle to the main transmission axis or otherwise than parallel thereto.

In the drawings:

Figure 3 is an enlarged cross sectional view of one of the rockers in which the trunnion blocks for the roller carriers are mounted.

Figure 4:
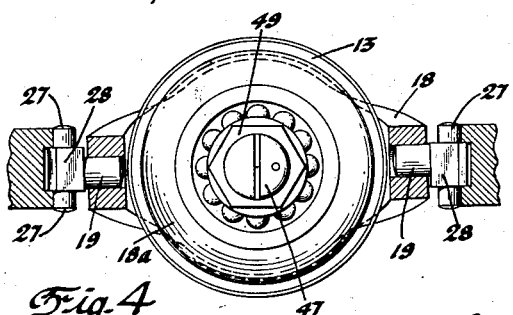

Figure 4 is a detail part sectional view (taken about on line 4—4, of Fig. 2) showing one of the roller carriers in which the rollers are mounted and the trunnion blocks on which the carriers are journaled to permit the carriers with the rollers to rock on axes at an angle to the axes on which the rollers rotate. A convenient way of mounting the roller carrier with its tilting axis inclined to the plane in which the roller revolves in planetary fashion around the axis of the discs is shown.

Figure 2:
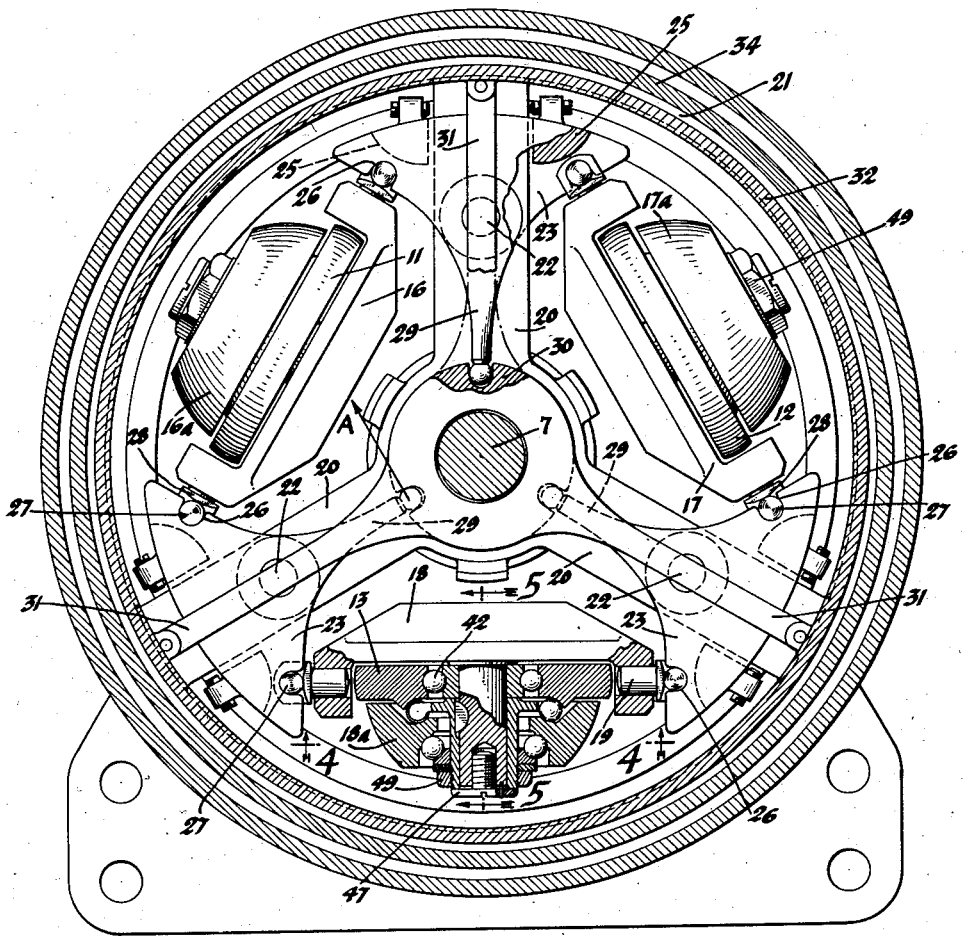
Figure 2 is a cross section taken about on line 2—2 of Figure 1 showing the mounting of the rollers with their balance wheels.

Fig. 5 is an enlarged view of a roller and balance wheel taken about a line 5—5 of Fig. 2 showing the mounting thereof and the manner in which the balance wheel is driven from the roller in an opposite direction thereto.

The driving disc 6, splined or slidably keyed on the driving shaft 7 is provided with a torus groove 8. The fixed stationary disc 9 is provided with a similar torus groove 10. Between the discs 6 and 9 are three transmission rollers 11, 12, 13, spaced 120° apart as in Fig. 2. The parts are pressed together to maintain engagement by a spring 7a.

The spider or roller cage 14 is splined or slidably keyed to the driven shaft 15.

The rollers 11, 12, 13, are mounted in carriers 16, 17, 18. The spider or roller cage 14 has three arms 20 supporting an outer ring 21.

Pivoted at 22 on each arm is a rocker composed of a front plate 23 and a rear plate 24, connected by webs 25. Recesses 26 in the side edges of the rockers receive the trunnions 27 of the trunnion blocks 28 which carry the spigots 19 for the roller carries. The axes of the trunnions 27 are parallel to the axis of the transmission.

The roller carriers are thus supported approximately in the plane of the spider and between the arms thereof.

Figure 1:
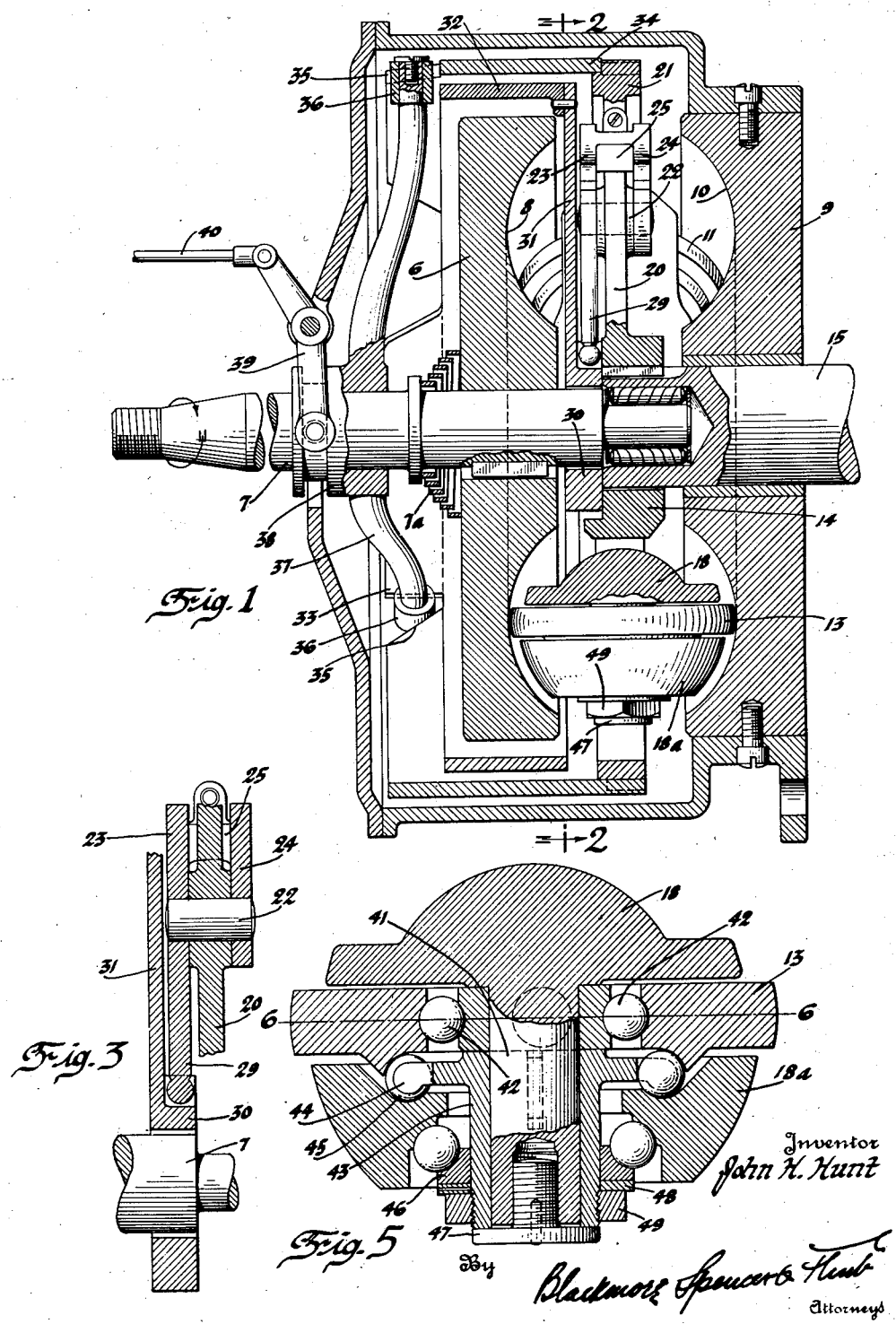
Figure 1 is a longitudinal central section in a vertical plane of a single toric planetary friction transmission embodying the invention.

Balance wheels 16a, 17a, 18a are mounted on the roller axes as shown in Figs. 1, 2, and 4, while Fig. 5 shows the method of mounting and the manner in which the wheel is driven from the roller in a reverse direction to the roller.

Fingers 29 extend radially inward from the rocker plates 23 and are equipped with ball ends engaging recesses in a ring 30 loosely encircling shaft 7. A slight rotary movement of ring 30 will turn the fingers 29 and with them the rockers 23 in an opposite direction about their pivots 22 thus shifting the roller carriers and effecting bodily displacement of the rollers from a position in which the roller axes intersect (i. e. are co-planar with) the axis of the discs into a position in which the axes are not co-planar. This is an unstable condition and the frictional forces acting on the roller will cause the roller to incline (i. e. to trace a spiral path on each disc) and the roller and carrier to turn i. e. "tilt" into a new ratio position on the carrier axis.

Assuming clockwise rotation of the driving shaft 7 and disc 6 (i. e. in the direction of the arrow on the shaft Fig. 1) a clockwise rotation of the ring 30 will result in a counter-clockwise bodily displacement of the roller relatively to disc 6, with a resultant tilt of the roller on to a larger radius of disc 6 and a smaller radius of disc 9 equivalent to a higher speed ratio of the roller cage relatively to the disc 6 i. e a higher gear ratio.

In order to effect a slight rotary movement of ring 30, the ring is connected to a drum shaped ring 32 by radial arms 31 and encircling this drum is a similar drum shaped ring 34 mounted on the ring 21 of roller cage 14. It will be seen that relative rotation of these two rings will result in the required relative rotation of ring 30 and bodily displacement of the rollers. The drum 34 is provided with cam edges 35 oblique to a radial plane and crossing the cam edges 33 of drum 32 which lie substantially in or parallel to a radial plane. Bowls 36 cooperating with the cam edges are carried by arms 37 extending radially from a sleeve ring 38 and rotatable relatively to the shaft 7. The sleeve is slidable in either direction through a fork 39 operated by shift rod 40 constituting the ratio control rod. Thus, when sleeve 38 is moved to the right in Fig. 1, the drum 32 and with it ring 30 will be given a clockwise movement relatively to drum 34 effecting change to a higher speed ratio as will be readily understood. It will be observed that the control can exert a cam action only in the direction to produce a higher speed ratio. Change to a lower speed ratio is effected by decreasing the force preventing movement of the sleeve 38 to the left which then moves to the left and to a lower speed ratio under the influence of the frictional resistance opposing transmission of power. For positive change of ratio in either direction, the drums may be provided with crossed cam slots not shown.

The bodily displacement described above which results in the projected roller axis being moved away from intersection of the disc or transmission axis is exactly the result produced by "inclination" by which is meant the turning of the roller about an axis passing through the points of contact of the roller and the disc races from a position in which the projected roller axis intersects (i. e. is co-planar with) the disc or transmission axis.

Whenever the axes are not co-planar and rotation exists the rollers will continue to change ratio position. It follows therefore that for any desired ratio the axes must be restored to co-planar condition just when the rollers begin to run on the race circles corresponding to the desired ratio. It is therefore necessary to provide some means whereby the normal motion of the parts in tilting cancels the bodily displacement or inclination which originated the tilting. This is achieved by arranging the axes of the roller carriers at an angle to the planes of the discs as illustrated in Fig. 4. When now the roller is displaced to a position in which its axis does not intersect the disc axis and the roller tilts into a new ratio position, the projected axis of the roller does not move in a plane parallel to the disc or transmission axis but due to the angularity of the roller carrier axis is bound to move back to a position in which it intersects the transmission axis thereby reaching equilibrium in the new ratio position. The angularity of the roller carrier axis is so chosen that the roller axis will intersect the transmission axis after tilting before the roller can leave the toric surfaces of the races with the maximum displacement which the control mechanism can bring about.

In order to equalize the load between the rollers so that each receives and delivers an equal amount of power, it is necessary to permit an overloaded roller to receive the necessary bodily displacement to reduce its load. This can only occur automatically if, as in the transmission herein described, the roller control is torque responsive and the resistance to speed changes proportional to the torque being transmitted. The necessary bodily displacement of an overloaded roller is permitted and effected in the following manner.

The ring 30 is provided with clearance about the shaft 7 and the arms 31 of the ring 30 and the drum 32 are sufficiently flexible and the slots engaging the ball ends of the arms 29 are deep enough to permit the ring 30 to move radially a small amount in any direction. There is a small amount of axial clearance of the ends of the carrier journals 19 on their bearings on the trunnion blocks 28. This makes it possible for one rocker 23 to turn slightly about its pin 22 without moving the adjacent rockers.

A part of the torque reaction of each roller is transmitted through the rockers 23 and the ball ends of the arms 29 to the ring 30. If all three arms 29 exert equal forces on the ring 30 the ring receives only a turning couple which is resisted by an equal couple supplied through the arms 31 but if the load on one of the rollers is greater, there will also be a force tending to move the ring 30 radially in the direction of the vector A. The motion will be practically parallel to the vector A, and will be permitted through the flexibility of the drum 32 with reference to forces applied normal to the surface of the drum. This radial motion will bring about equalization of the load by permitting a bodily displacement of the overloaded roller in a direction to cause it to tilt to a ratio angle where it tends to drive the roller cage at a slightly slower speed whilst the other rockers will be turned at the same time through small angles in the reverse direction with consequent bodily displacement and tilt to a ratio angle where they tend to drive the roller cage at a slightly faster speed. In this way equalization is obtained by adding load to the remaining rollers as load is removed from the overloaded roller.

Referring now to Fig. 5, the carrier 18 is provided with a spigot 41 constituting the physical axis around which the roller and balance wheel revolve. The roller 13 is mounted on a ball bearing 42. Fixed on the spigot 41 is a sleeve 43 with radial arms 44 serving as a stationary cage for the balls 45 between the roller 13 and the balance wheel 18a. The sleeve 43 is extended as shown to carry the ball bearing support 46 for the balance wheel. The inner race of the ball bearing 42 is clamped between the roller carrier 18 and the sleeve 43 by the cap screw 47. 48 is a spring washer between the nut 49 screwed on the sleeve 43 and adjusted to give sufficient axial loading and contact pressure between the rollers 13 balls 45 and balance wheel 18a, to transmit a drive from the roller 13 through the balls 45 to the balance wheel 18a.

It will be seen that since the cage for the balls 45 is held stationary the balance wheel 18a will be driven in the opposite direction to roller 13.

As shown in the drawings, the balance wheel will be given a slightly higher speed than the roller since the driven diameter of the former is less than the driving diameter of the latter.

The line 6—6 indicates the median plane of the roller and the masses grouped on the carrier on either side of this plane are so proportioned and arranged that they will have a resultant centrifugal moment opposing and counterbalancing the centrifugal torque tending to tilt the roller whenever the roller is in other than the one to two speed ratio position.

I claim:

1. In a transmission gearing, a planetary torque transmitting roller and carrier therefor, the axis of said roller lying at an angle to the axis about which it has planetary motion, a balance wheel of such mass and moment of inertia capable of being rotated around the roller axis in an opposite direction to the roller with such angular velocity that it will develop an opposing gyroscopic torque counterbalancing the gyroscopic torque tending to tilt the roller in a plane passing through the center of the roller and containing the transmission axis.

2. In a transmission gearing, a planetary torque transmitting roller and carrier therefor, the axis of said roller lying at an angle and otherwise than normal to the axis about which it has planetary motion, masses including the roller carrier and parts mounted thereon, proportioned and arranged so that the centrifugal moment about the axis around which the roller tends to tilt of those portions of the said masses on that side of the median plane of the roller more remote from the transmission axis is greater than the centrifugal moment of those portions of the said masses on that side of the roller nearer to the transmission axis by an amount such that the said masses will develop a resultant centrifugal torque opposing and counterbalancing the centrifugal torque tending to tilt the roller in a plane passing through the center of the roller and containing the transmission axis.

3. In combination a transmission gearing according to claim 1 in which the balance wheel forms part of the roller carrier masses on that side of the median plane of the roller more remote from the transmission axis, proportioned and arranged so that the centrifugal moment of the said masses about the axis around which the roller tends to tilt is greater than the centrifugal moment of the roller carrier masses on that side of the median plane of the roller nearer to the transmission axis by an amount such that the said masses will develop a resultant centrifugal torque opposing and counterbalancing the centrifugal torque tending to tilt the roller in a plane passing through the center of the roller and containing the transmission axis.

4. In combination, a transmission gearing according to claim 1 in which the speed ratio is variable by changing the angle at which the axis of the roller lies to the axis about which it has planetary motion and in which the balance wheel forms part of the roller carrier masses on that side of the median plane of the roller more remote from the transmission axis, proportioned and arranged so that the centrifugal moment of the said masses about the axis around which the roller tends to tilt is greater than the centrifugal moment of the roller carrier masses on that side of the median plane of the roller nearer to the transmission axis by an amount such that the said masses will develop a resultant centrifugal torque opposing and counterbalancing the centrifugal torque tending to tilt the roller in a plane passing through the center of the roller and containing the transmission axis.

5. In combination, a transmission gearing according to claim 1 in which the roller is interposed between coaxial torus discs in frictional torque transmitting contact therewith, the speed ratio being variable by tilting the roller on to a circle of contact of larger radius on one disc and lesser radius on the other disc and in which the balance wheel forms part of the roller carrier masses on that side of the median plane of the roller more remote from the transmission axis, proportioned and arranged so that the centrifugal moment of the said masses about the axis around which the roller tends to tilt is greater than the centrifugal moment of the roller carrier masses on that side of the median plane of the roller nearer to the transmission axis by an amount such that the said masses will develop a resultant centrifugal torque opposing and counterbalancing the centrifugal torque tending to tilt the roller in a plane passing through the center of the roller and containing the transmission axis.

6. In combination, a transmission gearing according to claim 1 having coaxial torus discs, a plurality of planetary torque transmitting rollers with carriers and balance wheels therefor interposed between said discs, means holding the discs and the rollers in frictional torque transmitting contact, means for causing the torque reaction of the frictional forces acting on the roller to tilt the rollers and change the speed ratio, means whereby the load carried by each roller is automatically equalized by a resultant tilt from a yielding displacement of an overloaded roller, each balance wheel forming part of the roller carrier masses on that side of the median plane of the roller more remote from the transmission axis, proportioned and arranged so that the centrifugal moment of the said masses about the axis around which the roller tends to tilt is greater than the centrifugal moment of the roller carrier masses on that side of the median plane of the roller nearer to the transmission axis by an amount such that the said masses will develop a resultant centrifugal torque opposing and counterbalancing the centrifugal torque tending to tilt the roller in a plane passing through the center of the roller and containing the transmission axis.

7. A planetary friction transmission mechanism including two discs, a torque transmitting planetary roller in tractive contact with said discs, a carrier for said roller, and a counterweight concentric with the roller axes, mounted on the carrier at that side of the roller more remote from the disc axis.

8. A transmission mechanism as in claim 7 in which the counterweight is a wheel capable of being rotated in an opposite direction to the roller.

9. In combination a transmission mechanism as in claim 1 with means for driving the balance wheel from the torque transmitting roller.

10. In combination a transmission mechanism as in claim 1 with friction driving means interposed between the roller and the balance wheel for driving the latter from the former.

11. In combination, a transmission mechanism as in claim 1 in which the torque transmitting roller is rotatable around a spigot mounted on the carrier, the balance wheel being rotatable around the same axis, balls interposed between the roller and balance wheel, a ball cage stationary on the spigot holding the balls in a fixed position relative thereto and pressure means holding the roller the balls and the balance wheel in tractive frictional contact.

In testimony whereof I affix my signature.

JOHN H. HUNT.